UNITED STATES PATENT OFFICE.

JULES H. HIRT, OF BROOKLINE, MASSACHUSETTS.

METHOD OF MAKING INGREDIENTS FOR PLASTER COMPOUNDS.

No. 801,874.  Specification of Letters Patent.  Patented Oct. 17, 1905.

Application filed August 12, 1905. Serial No. 273,909.

*To all whom it may concern:*

Be it known that I, JULES H. HIRT, a citizen of the United States, residing at Brookline, in the county of Norfolk and State of Massachusetts, have invented certain new and useful Improvements in Methods of Making an Ingredient for Plaster Compounds; and I do hereby declare the following to be a full, clear, and exact description of the invention, such as will enable others skilled in the art to which it appertains to make and use the same.

The present invention relates to an improvement in the method of making an ingredient for plaster compounds.

In the application filed by me June 28, 1905, Serial No. 267,343, I have described and claimed a method of making an ingredient for plaster compounds which consists in slaking lime in a closed vessel, adding water in excess of that required to slake the lime, and subsequently exhausting the excess moisture from the vessel. As a specific embodiment of this method I described the making of the plaster ingredient, which consisted in mixing pulverulent marble-dust with pulverulent quicklime in a closed vessel and adding water. One important feature of that method and the one by which the caking of the product was prevented both in the vessel and in subsequent storage resides in the application of the vacuum to the mass while in the closed vessel after the slaking operation. Experience with the method of said application has developed a defect and an uncertainty therein which arises from the variation in the amount of air in the lime before it is slaked as well as from the variable quantities of water in the occluded air. It is well known that freshly-calcined lime will gain from five to ten per cent. in weight during the first three or four days' exposure to the atmosphere. This is due not only to the air slaking by the absorption of carbonic acid, but also to the slaking by the absorption of moisture from the atmosphere. Under varying weather conditions, of course, the amount of air and water slaking due to such exposure would vary widely, and while such variation cannot be entirely remedied by the present method the evil effects therefrom are materially ameliorated. I have found that by applying a vacuum to the quicklime after it has been placed in the slaking vessel I remove the air and moisture from the lime and from the vessel and that this facilitates and renders more efficient the subsequent slaking of the lime when the water is introduced and secures a superior and more uniform product.

According to the present invention the plaster ingredient produced by my process consists of slaked lime or slaked lime mixed with a carbonate, such as marble-dust, and the specific method practiced by me is described as follows:

As an ingredient for rough or first coat plaster, equal quantities, by weight, of quicklime, the particles of which are of the size of wheat or corn, and marble-dust, ground to about one hundred mesh, are intimately mixed and introduced into a vessel, which is then closed and connected with a steam-exhauster, by means of which the air contained in the vessel and the occluded air and moisture in the lime and marble-dust are extracted. The vacuum should be applied for a sufficient length of time to reduce the pressure to about ten pounds below atmosphere, which may conveniently be secured by apparatus of sufficient size to secure such vacuum in the vessel within five or ten minutes. During the application of the vacuum the mass should be stirred to facilitate the removal of the air and moisture. Water in weight equal to forty or forty-five per cent. of the weight of the quicklime is then gradually introduced into the vessel. The water slakes the quicklime, and during the slaking process the mixture is stirred so as to expose every portion of the lime to the moisture. During the slaking process the pressure and the temperature in the vessel rise, the former to about forty to eighty pounds per square inch and the latter from 300° to 400° Fahrenheit. With a charge of a ton and a half of material it requires about one hour for the slaking process to be completed, at the end of which time and while the charge is still hot, but after the pressure has fallen about to atmosphere, the vessel is connected with the steam-exhauster and a vacuum of about ten pounds below atmosphere is produced, which operates to take away any excess of moisture present in the mass which is not chemically combined with the quicklime. During the application of the vacuum to the receptacle the stirring of the mass is continued and with a charge of about the size above referred to the duration of the application of the vacuum should be from five to ten minutes. The product of this process is an exceedingly fine dry pulverulent mass of slaked lime intimately mixed with marble-dust, which dust has been acted upon by the process in a manner which gives the plaster superior hardening and tensile qualities, as described in said application.

The above-described proportions are those used in making a plaster ingredient for use in the manufacture of rough or first coat plaster. In the manufacture of skim or finish-coat plaster the proportion of marble and lime is changed from that given above by increasing the amount of marble to from two to three times the weight of lime. For example, in making ingredient for rough-coat plaster fifteen hundred pounds each of lime and marble-dust would be used, while in making ingredients for the skim or finish-coat plaster seven hundred and fifty pounds of lime to two thousand two hundred and fifty pounds of marble-dust would be used.

The rough-coat ingredient may be mixed with an article of commerce known as "asbestos-sand" in proportion, by weight, of two of the ingredient to six of the sand and forms an efficient rough-coat plaster. The skim or finish-coat ingredient may be mixed with asbestos fiber in proportions, by weight, of one part of asbestos fiber to six parts of the ingredient. The staple of the fiber should preferably not be longer than the thickness of the skim or finish-coat.

The plaster made with this ingredient has even in a more marked degree than plaster made with the ingredient of said former application the quality of rapidly taking an initial set.

Having thus described the invention, what is claimed is—

1. The method of making plaster ingredient which consists in mixing a pulverulent carbonate with pulverulent quicklime in a closed vessel, exhausting the air from the vessel and adding water, substantially as described.

2. The method of making plaster ingredient which consists in mixing marble-dust with quicklime in a closed vessel, exhausting the air from the vessel and adding water, substantially as described.

3. The method of making plaster ingredient which consists in introducing quicklime into a closed vessel, exhausting the air from the vessel, adding water in excess of that required to slake the lime and subsequently exhausting the excess moisture from the vessel, substantially as described.

4. The method of making plaster ingredient which consists of introducing quicklime into a closed vessel, exhausting the air from the vessel, adding water in excess of that required to slake the lime, and then, while the charge is still hot exhausting the excess moisture from the vessel, substantially as described.

5. The method of making a plaster ingredient which consists in mixing marble-dust and quicklime in a closed vessel, exhausting the air from the vessel, adding water in excess of that required to slake the lime and subsequently exhausting the excess moisture from the vessel, substantially as described.

6. The method of making plaster ingredient which consists in introducing quicklime into a closed vessel, exhausting the air from the vessel and adding water to slake the lime, substantially as described.

In testimony whereof I affix my signature in presence of two witnesses.

JULES H. HIRT.

Witnesses:
 HORACE VAN EVEREN,
 FARNUM F. DORSEY.